United States Patent [19]

Tateishi

[11] Patent Number: 4,887,253

[45] Date of Patent: Dec. 12, 1989

[54] SCANNING METHOD AND APPARATUS FOR PERFORMING TRACK JUMP OPERATIONS IN DISK PLAYER

[75] Inventor: Kiyoshi Tateishi, Saitama, Japan

[73] Assignee: Pioneer Electronic Corporation, Tokyo, Japan

[21] Appl. No.: 209,728

[22] Filed: Jun. 22, 1988

[30] Foreign Application Priority Data

Sep. 1, 1987 [JP] Japan .................. 62-218400

[51] Int. Cl.⁴ .............................. G11B 7/00
[52] U.S. Cl. .................. 369/32; 358/342; 358/907; 360/78.04; 369/44; 369/56; 369/57
[58] Field of Search ............ 358/907, 342; 360/9.1, 360/10.1, 10.2, 78.04; 369/32, 43–47, 53, 54, 57, 58

[56] References Cited

U.S. PATENT DOCUMENTS

| | | | |
|---|---|---|---|
| 4,677,602 | 6/1987 | Okano et al. | 369/32 |
| 4,817,069 | 3/1989 | Shigemori | 369/32 |
| 4,817,073 | 3/1989 | Suzuki | 369/46 |
| 4,837,637 | 6/1989 | Akiyama et al. | 369/32 X |

FOREIGN PATENT DOCUMENTS 57-18036 5/1982 Japan .

Primary Examiner—Robert L. Richardson
Attorney, Agent, or Firm—Sughrue, Mion, Zinn, Macpeak & Seas

[57] ABSTRACT

A disk player and a method for operating a disk player in which the picture scanning speed for both a constant angular velocity disk and a constant linear velocity disk are made constant and independent of the characteristics of the slider which carries the pickup or of the radial position of the pickup relative the inner radius of the disk. During a jump operation, the number of tracks detected by a track counter is compared with a designated value, and the jump operation is repeated if a scanning command is still present at the end of the previous operation. In the case of a constant angular velocity disk, the designated value is a fixed value, whereas the designated value is calculated in accordance with the present position of the pickup for a constant linear velocity disk.

10 Claims, 3 Drawing Sheets 12,887,253

SCANNING METHOD AND APPARATUS FOR PERFORMING TRACK JUMP OPERATIONS IN DISK PLAYER

BACKGROUND OF THE INVENTION

The present invention relates to a scanning method and apparatus for use in a disk player such as a compact disk (CD) player or video disk player.

Conventional disk players are capable of performing a scanning operation in which a track jump operation and track tracing operation by the information detecting point of the pickup are alternately performed. High-speed reproduction of recorded information can be achieved using such a scanning operation.

Conventionally, for performing such a scanning operation, there has been employed a method in which a slider servo for controlling the relative position, in the radial direction of a recorded disk, of a slider carrying the pickup is disabled and then the slider is forcibly moved. According to such a conventional method, when the amount of deviation of a tracking actuator incorporated in the pickup becomes large and reaches near the limit of its movable range, a protective circuit for opening the tracking servo loop so as to protect the tracking actuator is operated to cause the tracking actuator to return to the center of its movable range. The information detecting point is made to jump over tracks by the operation of the tracking actuator. Then, the tracking servo loop is closed until the protective circuit is actuated again after the jump operation, whereupon the information detecting point traces a track to thereby read out recorded information from the track.

In such a conventional scanning method, there has been a problem in that the speed of reproduction cannot be made constant since the speed of the slider varies depending on its relative position in the radial direction and the direction of jumping in accordance with the characteristics of the slider unit.

SUMMARY OF THE INVENTION

The present invention has been attained in view of the foregoing problems. An object thereof is thus to provide a scanning method for a disk player in which the speed of reproduction is made constant.

In accordance with the above and other objects, there is provided a scanning method and apparatus for a disk player in which, in response to a scanning command, a tracking a servo loop is opened and a tracking actuator is driven so as to perform a track jump operation until the number of tracks obtained by a track counter detecting the number of tracks jumped by the information detecting point reaches a designated value, and in which, if the scanning command continues at a point of time after a lapse of predetermined period from the completion of the track jump operation, the jump operation is performed again.

DESCRIPTION OF THE PREFERRED EMBODIMENTS

Figure 1:
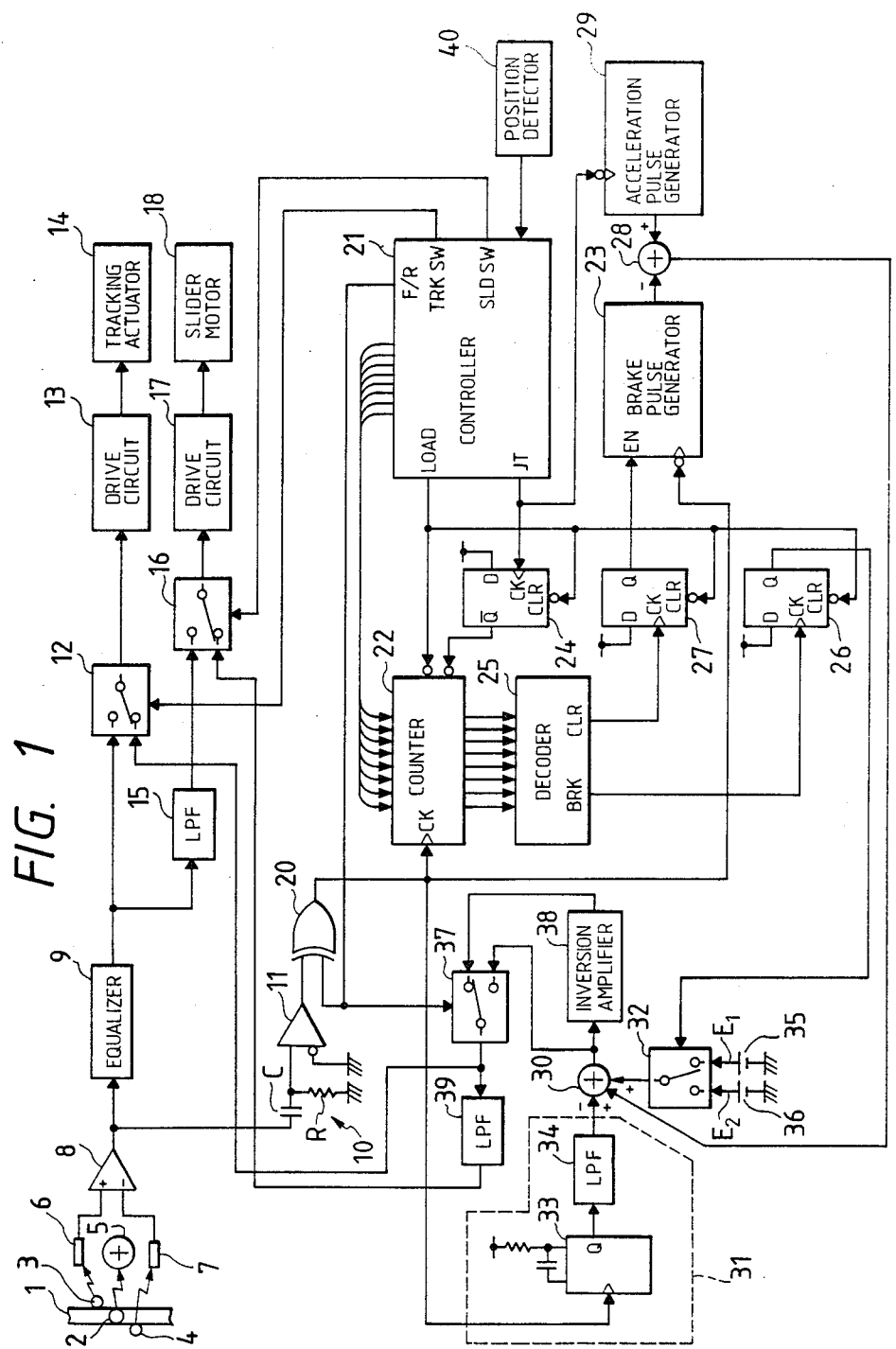
FIG. 1 is a block diagram of a disk player employing a disk scanning method and apparatus according to the present invention.

Preferred embodiments of the present invention will be described hereunder with reference to the drawings In FIG. 1, a recorded track 1 is irradiated with three light spots 2 to 4 obtained by converging laser beams in the illustrated positional relationship. That is, when the light spot 2 for detecting information is projected onto the recorded track 1 so that an information detecting point is formed on the recorded track 1, the other light spots 3 and 4 are radiated onto the opposite side edges of the recorded track 1. If the light spot 2 is displaced in the direction perpendicular to the recorded track 1, that is, in the radial direction of the recorded disk, the difference between the quantities of reflected light of the respective light spots 3 and 4 corresponds to the direction and amount of displacement of the light spot 2. The reflected light from the respective light spots 2 to 4 is converted into electric signals by photoelectric converter elements 5 to 7, respectively. The respective outputs of the photoelectric converter elements 6 and 7 are supplied to a differential amplifier 8 which produces an output signal corresponding to the difference between the respective output levels of the photoelectric converter elements 6 and 7, that is, a difference between the respective quantities of the reflected light of the light spots 3 and 4. The output signal of the differential amplifier 8 is supplied, as a tracking error signal a, to an equalizer amplifier 9.

The tracking error signal a is subjected to phase compensation by means of the equalizer amplifier 9 and then supplied to a tracking actuator 14 through a change-over switch 12 and a driving circuit 13. The tracking actuator 14 is constituted, for example, by a movable portion provided with an objective lens (not shown), a support portion for supporting the movable portion with a spring or the like, and an arrangement for displacing the movable portion in the radial direction relative to the recorded track 1 in response to a driving signal from the driving circuit 13. The driving signal corresponding to the tracking error signal a is supplied from the driving circuit 13 to the tracking actuator 14 so that the light spot 2 for detecting information is controlled to accurately track the recorded track 1.

A tracking servo loop for controlling the radial position of the information detecting point relative to the recorded track 1 with high accuracy is formed by the abovementioned elements. Since the movable region of the movable portion of the tracking actuator 14 in the tracking servo loop is extremely narrow in comparison with the radius of the recorded disk, the relative position of the information detecting point cannot be controlled over any extensive region of the whole radius of the recorded disk by only the tracking servo loop. For this reason, there is provided a slider servo loop in which a slider carrying the tracking actuator 14 mounted thereon is moved in the radial direction relative to the recorded track 1 so as to control the relative position of the information detecting point with low accuracy so that the information detecting point is positioned at about the center of the controllable region of the tracking servo loop.

Thus, the output of the equalizer amplifier 9 is supplied to a driving circuit 17 through a low pass filter (LPF) 15 and a change-over switch 16. The output of the driving circuit 17 is supplied to a slider motor 18 for radially moving the slider (not shown) carrying the tracking actuator 14.

On the other hand, the output of the differential amplifier 8 is supplied to a comparator 11 through a low-frequency cutoff filter 10 in the form of a differentiator circuit constituted by a capacitor C and a resistor R, and is thus compared with ground potential. The comparator 11 produces a pulse having leading and trailing edges in synchronism with the zero-crossings of a high-frequency component of the tracking error signal a. The output of the comparator 11 is supplied to one of the input terminals of an exclusive-OR gate 20. An F/R signal from a controller 21 is supplied to the other input terminal of the exclusive-OR gate 20. The F/R signal is a high-level signal which is produced when the jump operation is performed in the reverse direction (the inner-circumferential direction). As a result, the output of the comparator 11 is passed directly (without inversion) by the exclusive-OR gate 20 when the F/R signal is not present, while an inverted signal of the output of the comparator 11 is produced at the output of the exclusive-OR gate 20 when the F/R signal is present.

The pulse signal from the exclusive-OR gate 20 is supplied as a TZ signal to a clock input terminal of a counter 22 and to a trigger input terminal of a brake pulse generator 23. Jump data representing the number of tracks to be jumped is supplied to the counter 22. The jump number data is preset in the counter 22 as its count value in response to a LOAD signal fed from the controller 21. A low-level EN signal is supplied to the counter 22 from a $\overline{Q}$ output terminal of a D-type flip-flop 24. A JT signal from the controller 21 and the LOAD signal are respectively supplied to a clock input terminal CK and a clear input terminal of the D-type flip-flop 24. The power source voltage is applied to the D input terminal of the D-type flip-flop 24. The counter 22 is arranged to count down whenever it is supplied with a clock in a period when the EN signal is being produced. The output data of the counter 22 is supplied to a decoder 25. The decoder 25 outputs a high-level BRK signal when the value of the output data of the counter 22 reaches a predetermined value N and a high-level CLR signal when the output data of the counter is zero. The BRK signal and the CLR signal are respectively supplied to D-type flip-flops 26 and 27 as trigger inputs. The power source voltage is applied to the D input terminal of each of the D-type flip-flops 26 and 27. The D-type flip flops 26 and 27 are set respectively by the leading edges of the BRK signal and the CLR signal upon generation of the BRK signal and the CLR signal, respectively, so that the BRK signal and the CLR signal are latched (stored) in the D-type flip-flops 26 and 27. The LOAD signal is supplied to a clear terminal CLR of each of the D-type flip-flops 26 and 27.

The Q output of the D-type flip-flop 27 is supplied to an enable input terminal of the brake pulse generator 23. The brake pulse generator 23 is triggered by the TZ signal from the exclusive-OR gate 20 so as to output a brake pulse of a predetermined level for a period of time $T_1$. The output of the brake pulse generator 23 is supplied to an addition/subtraction circuit 28 as a subtraction input. The output of an acceleration pulse generator 29 is supplied to the addition/subtraction circuit 28 as an addition input.

The acceleration pulse generator 29 is triggered by the JT signal generated by the controller 21 so as to output an acceleration pulse of a predetermined level for a period of time $T_2$. The output of the addition/subtraction circuit 28 is supplied to an addition/subtraction circuit 30 as an addition input. A speed detection signal from a speed detecting circuit 31 and a reference speed signal from a change-over switch 32 are supplied to the addition/subtraction circuit 30 as subtraction and addition inputs thereto, respectively. A speed error signal, corresponding to the difference between the radial speed of the information detecting point and the reference speed, is output from the addition/subtraction circuit 30.

The TZ signal from the exclusive-OR gate 20 is supplied to the speed detecting circuit 31. In the speed detecting circuit 31, the TZ signal is applied to a monostable multivibrator 33 as a trigger input. The Q output of the monostable multivibrator 33 is applied through a low-pass filter (LPF) 34 as a speed detection signal having a voltage level corresponding to the radial speed of the information detecting point. Output voltages $E_1$ and $E_2$ of constant-voltage sources 35 and 36 are applied to two respective input terminals of the change-over switch 32. The voltage $E_1$ is, for example, set equal to the voltage level of the speed detection signal obtained when the frequency of the TZ signal from the exclusive-OR gate 20 is 10 kHz. On the other hand, the voltage $E_2$ is set equal to the voltage level of the speed detection signal obtained when the frequency of the TZ signal is 4 kHz. The Q output of D-type flip-flop 26 is supplied to a control input terminal of the change-over switch 32, which passes the voltage $E_1$ as a reference speed signal when the D-type flip-flop 26 is in a reset state, that is, when the BRK signal is not latched in the D-type flip-flop 26, and passes the voltage $E_2$ as a reference speed signal when the D-type flip-flop 26 is in a set state, that is, when the BRK signal is latched in the D-type flip-flop 26.

The speed error signal from the addition/subtraction circuit 30 is supplied to one input terminal of a change-over switch 37 directly and to the other input terminal through an inverting amplifier 38. The F/R signal from the controller 21 is supplied to a control input terminal of the change-over switch 37. The change-over switch 37, for example, passes the output of the addition/subtraction circuit 30 when the F/R signal is at a low level and passes the output of the inverting amplifier 38 when the F/R signal is at a high level. The output of the change-over switch 37 is supplied to the driving circuit 13 through the change-over switch 12, and at the same time supplied to the driving circuit 17 through an LPF 39 and the change-over switch 16. A high-level TRKSW signal and a high-level SLDSW signal are supplied from the controller 21 to respective control input terminals of the change-over switches 12 and 16. The change-over switch 12 passes the tracking error signal a fed through the equalizer amplifier 9 when the TRKSW signal is not being supplied and passes the speed error signal fed from the change-over switch 37 when the TRKSW signal is being supplied. On the other hand, the change-over switch 16 passes the tracking error signal a fed though the equalizer amplifier 9 and LPF 15 when the SLDSW signal is not being supplied and passes the speed error signal fed through the LPF 39 when the SLDSW signal is being supplied.

The output of a position detector 40 is supplied to the controller 21. The position detector 40, which may be constituted, for example, by a potentiometer or the like, detects the position of the slider and generates a position detection signal corresponding to the relative radial position of the information detecting point.

The controller 21, constituted, for example, by a microcomputer inclusive of a central processor ROM, RAM, timer, etc., repeatedly calculates at a period T the number of tracks to be jumped in one track jump operation in response to a scanning command generated by the user through a keying operation with a key in an operating section (not shown). That is, the controller 21 produces the track-number data and the LOAD signal, and then produces the JT signal, the TRKSW signal and the SLDSW signal at the appropriate timing.

Figure 2:
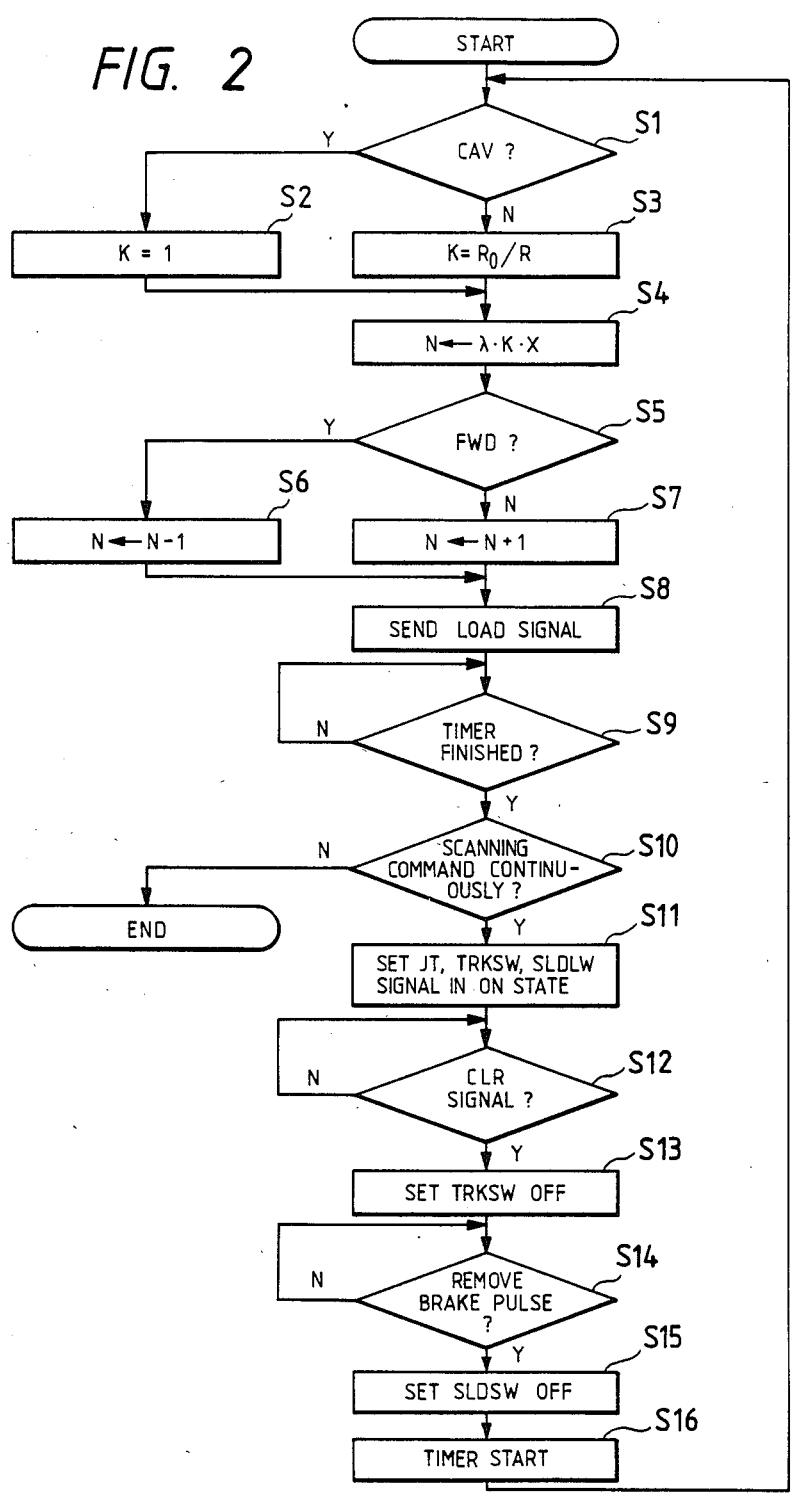
FIG. 2 is a flow chart showing the operation of a processor in an controller 21 of the apparatus of FIG. 1.

That is, when a scanning command is issued through a keying operation during the execution of a main routine or the like, with reference to FIG. 2, the processor in a step S1 judges whether the mounted disk is a CAV (constant angular velocity) disk or not. The judgement in the step S1 can be achieved by use of information recorded in a lead-in area of the disk.

If the judgement in the step S1 proves that the disk is a CAV disk, the processor sets the value of a constant K to 1 in a step S2, while if the judgement in the step S1 proves that the mounted disk is not a CAV disk, the processor calculates, as the value of the constant K, a value ($R_o/R$) corresponding to the present position data obtained from the position detection signal, that is, the data R corresponding to the radius of the present track on which the information detecting point is present, in a step S3. $R_o$ corresponds to the radius of the track located at the innermost circumference of the disk.

Next, the processor calculates the jump-track number N, in accordance with the following equation, in a step S4.

$$N = \lambda \cdot K \cdot \chi \quad (1)$$

where $\lambda$ is half the numerical value of a period expressed by the number of fields, and $\chi$ is the speed of visual scanning expressed as multiple of a normal speed.

Next, the processor judges whether the jump is to be made in the FWD direction (toward the outer circumference) or not in a step S5. If the judgement indicates that the jump is to be made in the FWD direction, in a step S6 the processor subtracts 1 from the value N calculated in the step S4. If the judgement indicates that the direction of the jump is not FWD, in a step S7 the processor adds 1 to the value N calculated in the step S4.

Next, the processor applies data representing the value N to the counter 22 using the LOAD signal in a step S8. Next, in a step S9 the processor judges whether the timing operation of the timer has been completed or not, and then in a step S10 judges whether the scanning command is being issued continuously or not only after the timing operation of the timer has finished. If the judgement in the step S10 proves that the scanning command is not being issued continuously, the processor restarts the execution of the routine which it had been executing just before movement into the step S1. If the judgement in the step S10 proves that the scanning command is issued continuously, the processor sends the JT signal and at the same time generates the TRKSW signal and the SLDSW signal in step S11.

Next, in a step S12 the processor judges whether the CLR signal has been produced or not, and in a step S13 removes the TRKSW signal only when the CLR signal has been produced The processor then in a step S14 judges whether the brake pulse from the brake pulse generator 24 has disappeared or not, and removes the SLDSW signal only when the brake pulse has disappeared in a step S15. Next, the processor sets the timer so that the time to be counted out by the timer is a predetermined time $T_3$, and then causes the timer to start the timing operation in a step S16, whereupon the procedure returns to the step S1.

If the LOAD signal is generated in the step S8, the jump-number data is preset in the counter 22 and at the same time the D-type flip-flops 24, 26 and 27 are reset. Thereafter, if the JT signal, the SLDSW signal and the TRKSW signal are produced by the controller 21 in the step S11, the acceleration pulse generator 29 is triggered and the change-over switches 12 and 16 are switched at the same time, so that the speed error signal is supplied to the tracking actuator driving circuit 13 and a low-frequency component of the speed error signal including DC component is supplied to the slider motor driving circuit 17. If the acceleration pulse generator 29 is triggered, the acceleration pulse is produced for the time $T_2$, and the level of the speed error signal begins to be increased by the acceleration pulse, whereupon the tracking actuator 14 begins to deviate suddenly and the information detecting point begins to move in the radial direction. At that time, since the D-type flip-flop 26 is in a reset state, the voltage $E_1$ is passed through the change-over switch 32 and supplied to the addition/subtraction circuit 30. A speed error signal corresponding to the difference between the voltage $E_1$ and the speed detection signal is therefore supplied to the tracking actuator 14 after the time $T_2$ has passed. The tracking actuator 14 is thus driven so as to cause the speed of the information detecting point to correspond to the voltage $E_1$. At the same time, the low-frequency component of the speed error signal including DC component is supplied to the driving circuit 17, so that the slider motor 18 is driven correspondingly to the amount of deviation of the tracking actuator 14.

The D-type flip-flop 24 is placed in the set state by the leading edge of the JT signal, and the EN signal is generated when the JT signal disappears. The counting operation of the counter 22 is then started, the count value of the counter 22 being decreased by 1 by the leading edge of the TZ signal generated whenever the information detecting point jumps over a track.

When the count value of the counter 22 reaches a predetermined value N, the BRK signal is produced and the D-type flip-flop 26 is placed in the set state by the leading edge of the BRK signal so as to latch the BRK signal. The voltage $E_2$ is selectively passed through the change-over switch 32 by the latched BRK signal, and the level of the speed error signal is lowered, and hence the speed of the information detecting point is lowered.

When the count value of the counter 22 becomes zero thereafter, the CLR signal is produced by the decoder 25. The D-type flip-flop 27 is then placed in a set state by the leading edge of the CLR signal so as to latch the CLR signal. At the same time, the TRKSW signal from the controller 21 disappears in the step S13, and the control operation of the tracking servo is started and the radial movement of the information detecting point is stopped. The latched CLR signal is supplied to the enable input terminal of the brake pulse generator 24. The brake pulse generator 24 is triggered by the trailing edge of the first TZ signal after the generation of the CLR signal, and the brake pulse is produced for the time $T_1$. The level of the speed error signal is therefore made negative so that the slider motor 18 is suddenly decelerated and stopped from rotating. The SLDSW signal from the controller 21 disappears during the operation of the step S15 when the brake pulse disappears, and the control operation of the slider servo means is started.

Figure 3:
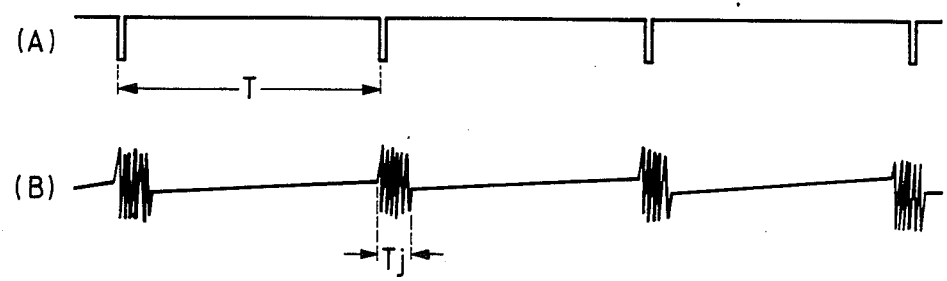
FIG. 3 is a waveform diagram illustrating the operation of various parts of the apparatus of FIG. 1.

Assuming that the timing output value of the timer has been set to a predetermined time $T_3$ and the timing operation has been started, and that the scanning command is being issued continuously in the step S9 at the end of the timing operation of the timer, the JT signal is sent out. Thus, the JT signal is produced with a period T which is equal to a period obtained by adding a jump period $T_j$ to the predetermined time $T_3$ as shown in FIG. 3 in waveform (A). After the jump operation has been performed on the basis of the JT signal as described above, the tracking servo loop is closed, whereupon the tracking error signal appears as shown FIG. 3 in waveform (B).

In the steps S1 to S7 used to calculate the number of tracks to be jumped, if the mounted disk is a CAV disk, the value of the constant K is set to 1 independently of the position of the information detecting point in the step S2 so that the number of tracks to be jumped over in one jump operation does not change. In the case of a CAV disk, a constant quantity of information, for example, a frame of video information, is recorded in every track of one revolution at any radial position so that the picture changes at a constant rate.

Further, in the case where the mounted disk is a CLV disk, in the step S3, the value of the constant K is set to a value ($R_o/R$) corresponding to the position of the information detecting point.

Then, the distance $l_o$ over which the information detecting point moves relative to the disk for one revolution along the innermost circumference is expressed by the following equation:

$$l_o = 2\pi R_o \quad (2)$$

On the other hand, the distance l over which the information detecting point moves relative to the disk for one revolution along the present circumference is expressed by:

$$l = 2\pi R \quad (3)$$

Assuming that the times required for one revolution along the innermost circumference and along the present circumference are $\Delta t_o$ and $\Delta t$, respectively, the following equation is established since the linear velocity v is constant.

$$v = 2\pi R_o/\Delta t_o = 2\pi R/\Delta t \quad (4)$$

The equation (4) may be rewritten as the following equation:

$$\Delta t/\Delta t_o = R/R_o \quad (5)$$

Assuming that the jumping operation is repeated at a period T, $N_o$ tracks are jumped over from the innermost circumference at the first jumping operation. A period $t_{oj}$ required for normal picture reproducing of the first jumped tracks is expressed by the following equation (6).

$$t_{oj} = N_o \cdot \Delta t_o \quad (6)$$

A period $t_j$ required for normal picture reproducing of N tracks jumped from a track having radius R with the period T is expressed by the following equation (7).

$$t_j = N \cdot \Delta t \quad (7)$$

Strictly speaking, in reproducing the CLV (Constant Linear Velocity) disk the time period $\Delta t$ required for one revolution along the beginning track having radius R is different from a period $\Delta t'$ required for one revolution along a track having a radius $(R+\Delta r)$. However, assuming that track pitch is $1.6\mu$ when 100 tracks are jumped over in the period T, the information detecting point moves only 0.16 mm as a displacement $\Delta r$ in a radial direction. The movement distance $\Delta r$ in the radial direction is extremely small as compared with the radius of the circumference.

Accordingly, the variation in the time periods required for one revolution of the respective tracks may be negligible. Therefore, the N tracks jumped over may be made equivalent to the period of $N \cdot \Delta t$ as normal picture reproducing speed.

In order to equalize the respective picture scanning speeds, that is, the respective reproduction speeds, at the innermost circumference and at the present position, it suffices to establish $t_{oj} = t_j$, and it is therefore apparent from the equations (6) and (7) that it suffices to establish the following equation:

$$N_o \cdot \Delta t_o = N \cdot \Delta t \quad (8)$$

The following equation is established from the equations (8) and (5):

$$N = N_o \cdot \Delta t_o/\Delta t = N_o R_o/R \quad (9)$$

Therefore, if the jump-number $N_o$ at the present position is set to be a value obtained by multiplying the jump-number N at the innermost circumference by $R_o/R$, the picture scanning speed becomes constant. Thus, the CLV disk reproduction speed can be made constant since the value of the constant K is set to $R_o/R$ in the step S3.

The reproduction speed effected by the scanning operation is described hereunder. Assuming that the normal picture reproducing speed is defined by 1 multiplex speed, the 1 track reproduction requires a period of 2 $T_v$ at innermost circumference having 2 fields ($T_v$) information. The normal picture reproducing speed is expressed $1/(2T_v) = 1$ multiplex speed.

At the innermost circumference the information detecting point moves $N_o$ tracks at the period T. When the period T is 3 $T_v$, the picture scanning speed is expressed by the following equation.

$$N_o/T = N_o/3T_v = (\tfrac{1}{2}T_v) \cdot (\tfrac{2}{3})N_o = (\tfrac{2}{3})N_o \text{ multiplex speed}$$

Now when the information detecting point jumps 30 tracks at period of 3 $T_v$, the picture scanning speed becomes $\tfrac{2}{3} \times 30 = 20$ multiplex speed.

In order to make the picture scanning speed to 20 multiplex speed at the outermost circumference, the information detecting point jumps $30 \times (55/145) = 11.38$ tracks at the period T. The number of tracks 11.38 is obtained from the equation (9) where $R_o$ 55 mm, R = 145 mm and $N_o = 30$.

For example, if $N_o = 30$ tracks, the speed becomes 20 multiplex speed.

Assume now that the radius $R_o$ of the innermost track is 55 mm, the radius of the outermost track is 145 mm, and $N_o$ is 30. Then, the jump number at the outermost circumference is 30 (55/144)=11.8 tracks from the equation (9).

Figure 4:
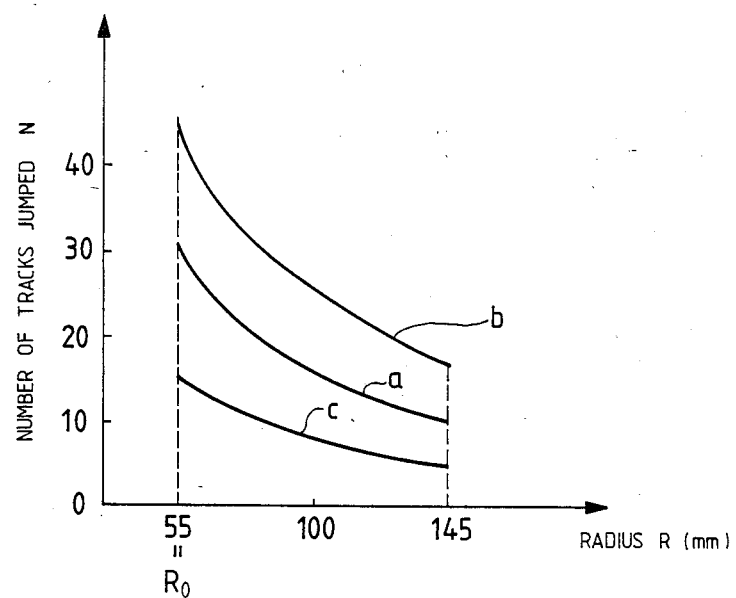
FIG. 4 is a graph illustrating the number of tracks to be jumped over in the case of $T=3T_v$.

In order to make the reproduction speed constant at 20 multiplex speed in the case of $T=3T_v$, it suffices to change the number of tracks to be jumped over from 30 to 11, as shown by a curve a in FIG. 4, as the information detecting point moves from the innermost circumference to the outermost circumference. In FIG. 4, curves b and c represent the respective numbers of tracks to be jumped over in the cases of 30 multiplex speed and 10 multiplex speed.

Since the information detecting point moves toward the outer circumference while the tracking servo loop is closed after a jump operation, it is necessary to correct the calculated number of tracks to be jumped over. The moving time while the tracking servo loop is closed is obtained by subtracting the time $T_j$ required for one jump from the period T of the jump operation.

Therefore, by making the respective numbers of tracks to be jumped over in the cases of FWD and REV $N-(T-T_j)/2T_v$ and $N+(T-T_j)/2T_v$, respectively it is possible to equalize the respective reproduction speeds for FWD and REV. Assuming that the time $t_j$ is 13 msec and the period T is 46 msec, $(T-T_j)$ becomes 33 msec (equal to about $2T_v$), and the same reproduction speed is obtained for both FWD and REV by establishing $N-1$ and $N+1$ for FWD and REV, respectively. This correction is performed in the steps S5 to S7.

As described above in detail, in the scanning method and apparatus for a disk player according to the present invention, in response to a scanning command, the tracking servo loop is turned off and the tracking actuator is driven so as to perform jump operations until the number of tracks obtained by a track counter detecting the number of tracks jumped over by the information detection point reaches a designated value, and in which, if the scanning command continues at a point of time after a lapse of a predetermined period from the completion of the jump operation, the jump operation is performed again. Thus, the speed of movement of the information detecting point in the radial direction of a disk is independent of the characteristics of the slider unit, and hence the speed of reproduction during the scanning operation (the picture scanning speed) is made constant. Moreover, since the number of tracks to be jumped and the period for the actuation of the jump operation can be set to desired values, the speed of reproduction during the scanning operation can be set desirably.

What is claimed is:

1. In a disk player comprising a slider for carrying a pickup movably in the radial direction of a recorded disk, said pickup having a tracking actuator for adjusting a relative position of an information detecting point in a direction substantially perpendicular to a recorded track on said recorded disk, tracking error signal generating means for generating a tracking error signal corresponding to an amount of deviation of said information detecting point from said recorded track, a tracking servo loop for driving said tracking actuator so as to make said tracking error signal a minimum, and signal processing means for reproducing a readout signal obtained from said pickup when said tracking servo loop is closed, a scanning method comprising the steps of: opening said tracking servo loop in response to a scanning command; driving said tracking actuator to perform a jump operation until a number of tracks detected by a track counter for detecting a number of tracks jumped by said information detecting point reaches a designated value; and, if said scanning command continues at a point of time after a lapse of predetermined period from completion of said jump operation, performing said jump operation again.

2. The scanning method for a disk player of claim 1, wherein said designated value is determined in such a manner that a picture scanning speed for said jump operation is constant and independent of a radial position of said information detecting point to said disk.

3. The scanning method for a disk player of claim 2, wherein, for a constant linear velocity disk, said designated value is equal to $N-(T-T_j)/2T_v$ for a jump operation in a forward direction and $N+(T-T_j)/2T_v$ for a jump operation in a reverse direction, where T is a period of actuation of the jump operation, $T_j$ is a period of time for jumping one track, $T_v$ is a field period of recorded picture information, and N is equal to $N_o\cdot R_o/R$, where $N_o$ is a number of tracks jumped over per jump operation at an innermost circumference of said disk, $R_o$ is an innermost radius of information recorded on said disk, and R is a radius of the present position of said information detecting point.

4. The scanning method for a disk player of claim 2, wherein, for a constant angular velocity disk, said designated value is a constant value.

5. The scanning method for a disk player of claim 1, further comprising the steps of: providing a speed error signal indicative of an amount of deviation of a speed of said pickup from a predetermined value during said jump operation; supplying said speed error signal as a control signal to a tracking actuator driving circuit for driving said tracking actuator; integrating said speed error signal; and supplying said speed error signal as a control signal to a slider motor driving circuit for driving said slider.

6. A disk player comprising: a pickup and a slider for carrying said pickup movably in the radial direction of a recorded disk, said pickup comprising a tracking actuator for adjusting a relative position of an information detecting point in a direction substantially perpendicular to a recorded track on said recorded disk; tracking error signal generating means for generating a tracking error signal corresponding to an amount of deviation of said information detecting point from said recorded track; a tracking servo for driving said tracking actuator so as to make said tracking error signal a minimum; signal processing means for reproducing a read-out signal obtained from said pickup when said tracking servo loop is closed; means for opening said tracking servo loop in response to a scanning command; a track counter for detecting a number of tracks jumped during a jump operation; driving means for driving said tracking actuator to perform a jump operation until a number of tracks detected by said track counter reaches a designated value; detecting means for detecting the presence of said scanning command for a predetermined time period after the completion of said jump operation; and means responsive to said detecting means for causing said driving means to perform said jump operation again.

7. The disk player of claim 6, wherein said designated value is determined in such a manner that a picture scanning speed for said jump operation is constant and independent of a radial position of said information detecting point to said disk.

8. The disk player of claim 7, wherein, for a constant linear velocity disk, said designated value is equal to $N-(T-T_j)/2T_v$ for a jump operation in a forward direction and $N+(T-T_j)/2T_v$ for a jump operation in a reverse direction, where T is a period of actuation of the jump operation, $T_j$ is a period of time for jumping one track, $T_v$ is a field period of recorded picture information, and N is equal to $N_oR_o/R$, where $N_o$ is a number of tracks jumped over per jump operation at an innermost circumference of said disk, $R_o$ is an innermost radius of information recorded on said disk, and R is a radius of the present position of said information detecting point.

9. The disk player of claim 7, wherein, for a constant angular velocity disk, said designated value is a constant value.

10. The disk player of claim 6, further comprising: a tracking actuator driving circuit for driving said tracking actuator; a slider motor driving circuit for driving said slider; means for providing a speed error signal indicative of an amount of deviation of a speed of said pickup from a predetermined value during said jump operation, said speed error signal being supplied as a control signal to said tracking actuator driving circuit; means for integrating said speed error signal, said speed error signal being supplied as a control signal to said slider motor circuit.

* * * * *